United States Patent

Ling

[11] Patent Number: 4,731,436
[45] Date of Patent: Mar. 15, 1988

[54] THERMOSETTING CROSSLINKED IMIDE RESIN FROM BIS-IMIDE AND POLYAMINE

[75] Inventor: Chi-Fei Ling, South Plainfield, N.J.

[73] Assignee: BTL Specialty Resins Corporation, Warren, N.J.

[21] Appl. No.: 916,283

[22] Filed: Oct. 7, 1986

[51] Int. Cl.$^4$ .............................................. C08G 73/10
[52] U.S. Cl. .................................. 528/322; 528/170; 528/176; 528/192; 528/220; 528/228; 528/321
[58] Field of Search ............... 528/322, 170, 176, 192, 528/220, 228, 321

[56] References Cited

U.S. PATENT DOCUMENTS

| | | | |
|---|---|---|---|
| 2,818,405 | 12/1957 | Kovacic | 528/322 |
| 3,669,930 | 6/1972 | Asahara et al. | 528/322 |
| 3,740,378 | 6/1973 | Crivello | 528/322 |
| 3,910,859 | 10/1975 | Bargain | 528/322 |
| 3,998,904 | 12/1976 | Balme et al. | 528/322 |
| 4,035,345 | 7/1977 | DuCloux et al. | 528/322 |

Primary Examiner—Harold D. Anderson
Attorney, Agent, or Firm—Rodman and Rodman

[57] ABSTRACT

A thermosetting cross-linked imide resin formed from the reaction of an amine having the formula

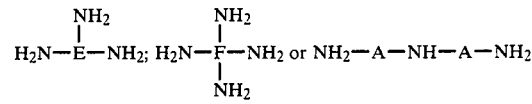

wherein E and F are trivalent and tetravalent groups, respectively, and A is a divalent group with at least 2 carbon atoms; with an N,N'-bis-imide of an unsaturated dicarboxylic acid having the formula:

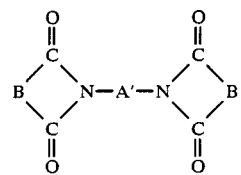

wherein B is a divalent group containing a —C=C— bond, and A' is a divalent group with at least two carbon atoms.

19 Claims, No Drawings

THERMOSETTING CROSSLINKED IMIDE RESIN FROM BIS-IMIDE AND POLYAMINE

BACKGROUND OF THE INVENTION

1. Field of the Invention

The present invention relates to improved thermosetting imide resins with enhanced thermal stability, and a process for making such resins.

2. Description of the Prior Art

U.S. Pat. No. 3,562,223 to Bargain et al, discloses cross-linked resins that are resistant to severe thermal stresses which are obtained through the reaction of an N,N'-bis-imide of an unsaturated dicarboxylic acid and a diamine.

U.S. Pat. No. 4,211,861 to Stenzenberger, discloses thermosetting imide resins obtained by reacting an N,N'-bis-imide of an unsaturated dicarboxylic acid with a hydrazide of an amino acid.

SUMMARY OF THE INVENTION

The present invention relates to a thermosetting cross-linked imide resin formed from the reaction of at least one triamine or tetraamine and an N,N'-bis-imide of an unsaturated dicarboxylic acid.

DESCRIPTION OF THE PREFERRED EMBODIMENTS

In accordance with the present invention, improved thermosetting imide resins are obtained by reacting a triamine or a tetraamine of the formula:

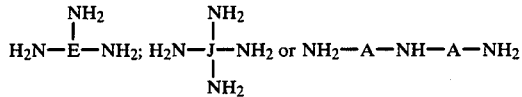

wherein E and J are trivalent and tetravalent groups, respectively, and A is a divalent group with at least 2 carbon atoms; with an N,N'-bis-imide of an unsaturated dicarboxylic acid having the formula:

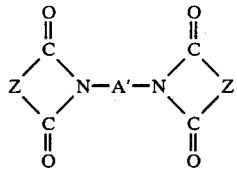

wherein B is a divalent group containing a carbon to carbon double bond, and A' is a divalent group with at least two carbon atoms. The molar ratio of bis-imide to triamine or tetraamine varies from about 1.5:1 to about 50:1, respectively.

The symbols A or A' can represent linear or branched alkylene radicals having less than 13 carbon atoms, cycloalkylene radicals having 5 or 6 carbon atoms in the ring, heterocyclic radicals containing at least one of the atoms O, N and S, or a phenylene or polycyclic aromatic radical. These various radicals can carry substituents which do not give undesired side-reactions under the operating conditions. The symbols A or A' can also represent phenylene or alicyclic radicals connected directly or by a divalent atom or group such as, for example, oxygen or sulfur an alkylene grouping of 1 to 3 carbon atoms, or one of the groups $-NR_4-$, $-P(O)R_3-$, $N=N-$,

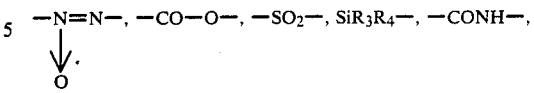

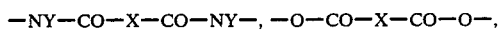

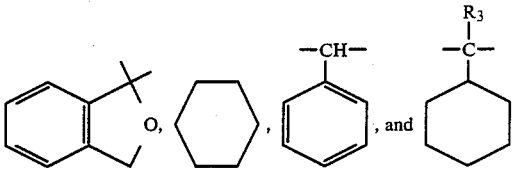

in which $R_3$, $R_4$ and Y each represent alkyl of 1 to 4 carbon atoms, or a cycloalkyl radical having 5 or 6 carbon atoms in the ring, or a phenyl or polycyclic aromatic radical, and X represents a straight or branched alkylene radical having less than 13 carbon atoms, a cycloalkylene radical having 5 or 6 carbon atoms in the ring, or a mono- or polycyclic arylene radical.

Bis-imides which are suitable in the present invention include N,N'-ethylene-bismaleimide, N,N'-hexamethylene-bismaleimide, N,N'-metaphenylene-bismaleimide, N,N'-paraphenylene-bismaleimide, N,N'-4,4'-diphenylmethane-bismaleimide, N,N'-4,4'-diphenylether-bismaleimide, N,N'-4,4'-diphenylsulphone-bismaleimide, N,N'-4,4'-dicyclohexylmethane-bismaleimide, N,N'-α,α'-4,4'-dimethylenecyclohexane-bismaleimide, N,N'-metaxylylene-bismaleimide, N,N'-4,4'-diphenylcyclohexane-bismaleimide, N,N'-dodecamethylene-bismaleimide, N,N'-(2,2,4-trimethylhexamethylene-bismaleimide, N,N'-4,4'-diphenylsulfide-bismaleimide, N,N'-2,4-toluene-bismaleimide, N,N'-2,6-toluene-bismaleimide, N,N'-p-xylylene-bismaleimide, N,N'-m-phenylene-bis-citraconimide, N,N'-4,4'-diphenyl methane bis-citraconimide, and N,N'-4,4'-diphenyl methane bis-itaconimide.

Triamines which are suitable in the present invention include: N-(4-aminobutyl)ethylenediamine, 1,2,4-benzenetriamine, diethylenetriamine, 2,4,5-triamino-6-hydroxypyrimidine, 2,4,6-triamino-5-nitrosopyrimidine, triamino-6-phenylpteridine, 2,4,6-triaminopyrimidine, and 2,4-bis(p-aminobenzyl)aniline, and α,α',α''-tris(4-aminophenyl)-1,3,5-triisopropyl benzene.

Tetraamines that are suitable in the present invention include: 1,2,4,5-tetraaminobenzene, 3,3',4,4'-tetraaminobenzophenone, 3,3',4,4'-tetraaminodiphenyl, 3,3',4,4'-tetraaminodiphenyl ether, 2,4,5,6-tetraaminopyrimidine, and 2,2'-bis(aminobenzyl)methylenedianiline.

Mixtures of triamines and tetraamines are also contemplated by the present invention.

The ratio of bis-imide to triamine or tetraamine can vary from about 1.5:1 to about 50:1, respectively, in moles, and preferably about 2:1 to about 10:1, respectively.

The formation of the imide resins of the present invention is preferably carried out in an inert polar organic solvent or diluent, such as dimethyl formamide, dimethyl acetamide, N-methyl pyrrolidone, tetramethyl urea, and the like. Solvents of a low boiling point such as dioxane or tetrahydrofuran can also be used for producing the prepolymerization products of this invention. Formation of the prepolymerization products is preferably carried out in the above mentioned diluents when further processing requires the use of a solution.

The preparation may also be carried out in bulk, by heating the reactants which have previously been intimately mixed. Depending upon the physical state of the reactants, conventional methods may be employed for mixing finely divided solids, or a solution or a dispersion of one of the reactants in the other, maintained in the liquid state, may be prepared. For many uses, it is advantageous to first heat the mixture of the two reactants at a moderate temperature of the order of 100° to 250° C. for about one minute to two hours, at a rate of at least 1° C. per minute, and cooled rapidly to room temperature in about one hour to solidify the product into brittle flakes or chunks, which optionally may be pulverized into powders.

The prepolymer thus obtained may then be employed in solution in a solvent such as those referred to above or in suspension in an inert diluent, or it may be shaped by simple hot casting, or again it may be employed as powder.

For certain applications, it is advantageous to retard curing or setting which proceeds via a vinyl polymerization. In such instances the production of the imide resins is carried out in the presence of polymerization inhibitors, such as 4-methoxyphenol or hydroquinone. The amounts of inhibitor added are between about 0.1% and about 2.0%.

In a second phase, the hardening of the prepolymer may be directly effected by heating to temperatures up to 350° C., optionally under pressure.

The mixture may also be directly brought into the form of the desired article and the hardening may be effected by heating, optionally under pressure.

The new resins after curing are infusible and insoluble. They have remarkable resistance to thermal stresses, have good dielectric properties and are endowed with excellent stability to chemical agents. They may be converted into multicellular materials or employed for bonding metals. They are also particularly useful for the preparation of laminates based on mineral or synthetic fibers or of molded articles optionally in association with fibrous or pulverulent fillers.

The following examples illustrate specific embodiments of the present invention. In the examples and throughout the disclosure, all parts and percentages are by weight, unless otherwise indicated.

EXAMPLE 1

64.5 grams of 4,4'-diphenylmethane-bismaleimide and 12.1 grams of 2,4-bis(p-aminobenzyl)aniline were mixed together and heated to 150° C. to melt both components. After 10 minutes at 150° C., the molten material was allowed to cool down rapidly to room temperature in about one hour to solidify the product resin. This solid resin can re-melt at 110°-130° C. and begins to cure (gel point) at 200° C. in 60 seconds. The cured material exhibits excellent chemical resistance to polar and nonpolar solvents and it had a glass transition temperature of about 300° C.

EXAMPLE 2

4.3 grams of 4,4'-diphenylmethane-bismaleimide and 0.6 grams of 2,4-bis(p-aminobenzyl)aniline were mixed and heated to 150° C. to melt both components. After 15 minutes at 150° C., the molten material was placed in an oven at 220° C. for 4 hours. The cured resin was then put in an oven at 316° C. to age. After 40 hours the weight loss was 2.1%, which is very small when compared to other thermosetting resins such as phenolics and polyester. Also, the cured resin of the present invention showed no blistering at temperatures of about 200° C. to 250° C.

EXAMPLE 3

153.2 grams of the product of Example 1 was dissolved in 125.3 grams of dimethylformamide to form a 55% solution, which was then used to impregnate a piece of glass cloth. After drying in an oven at 150° C., a prepreg was thus obtained. Stacking several layers of prepregs together with copper foil on both sides as facings produced a sandwich structure which was then pressed and cured to form a laminate. Under the conditions of 2 hours curing at 180° C. and 4 hours post curing at 220° C., the laminate had a glass transition temperature of 310° C. and peel strength of 8.5 lbs/inch (copper to substrate), indicating excellent adhesion properties. The laminate was also dimensionally stable and resistant to warpage and delamination.

EXAMPLE 4

(a) Prior Art

In a manner consistent with the process and composition described in U.S. Pat. No. 3,562,223 to Bargain et al, 0.57 grams (14.3%) of methylenedianiline was mixed with 3.43 grams (85.7%) of 4,4'-diphenylmethane-bismaleimide then reacted and cured under the same conditions as in Example 2. 17.4 milligrams of the cured material was then subjected to thermogravimetric analysis (TGA) under nitrogen in a temperature range of 50°-600° C. The instrument used was a Perkin-Elmer Series 7 Thermal Analysis System, and the heating rate was 20° C. per minute. The results, plotted on a weight (%) versus temperature graph, showed that the material started to decompose at 441.7° C.

(b) Inventive Composition

Similarly 0.57 grams (14.3%) of 2,4-(bisaminobenzyl)aniline was mixed with 3.43 grams (85.7%) of 4,4'-diphenylmethane-bismaleimide, then reacted and cured in the same manner noted in Example 2. 15.8 milligrams of the cured resin composition was again analyzed by TGA on the same Perkin-Elmer instrument. The results showed that the decomposition temperature of the resin material containing the triamine was 455.7° C., 14° C. higher than the material containing methylenedianiline, a diamine. The 14° C. higher decomposition temperature achieved by the inventive composition indicates higher thermal oxidation stability. For printed circuit board and electronic applications, a 14° C. temperature difference represents a substantial advance in the state of the art since the useful operating temperature of electronic circuitry is increased and the circuitry can operate for longer periods of time.

What is claimed is:

1. A thermosetting cross-linked imide resin consisting of the polymeric reaction product formed from the non-catalytic reaction of a single aromatic polyamine selected from the group consisting of:

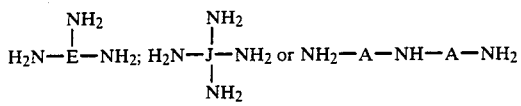

wherein E and J are aromatic trivalent and tetravalent groups, respectively, and A is a divalent group with at least one aryl moiety; with an aromatic N,N'-bis-imide of an unsaturated dicarboxylic acid having the formula:

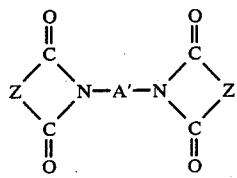

wherein Z is a divalent group containing a —C≡C— bond, and A' is a divalent group with at least one aryl moiety.

2. The resin of claim 1, wherein the molar ratio of bis-imide to amine varies from about 1.5:1 to about 50:1, respectively.

3. The resin of claim 2, wherein the molar ratio of bis-imide to amine varies from about 2:1 to about 50:1.

4. The resin of claim 1, wherein the N,N'-bis-imide is selected from the group consisting of:
N,N'-metaphenylene-bismaleimide,
N,N'-paraphenylene-bismaleimide,
N,N'-4,4'-diphenylmethane-bismaleimide,
N,N'-4,4'-diphenylether-bismaleimide,
N,N'-4,4'-diphenylsulphone-bismaleimide,
N,N'-metaxylylene-bismaleimide,
N,N'-4,4'-diphenylcyclohexane-bismaleimide,
N,N'-4,4'-diphenylsulfide-bismaleimide,
N,N'-2,4-toluene-bismaleimide,
N,N'-2,6-toluene-bismaleimide,
N,N'-p-xylylene-bismaleimide,
N,N'-m-phenylene-bis-citraconimide,
N,N'-4,4'-diphenyl methane bis-citraconimide, and
N,N'-4,4'-diphenyl methane bis-itaconimide.

5. The resin of claim 1, wherein the amine is selected from the group consisting of:
1,2,4-benzenetriamine,
2,4,5-triamino-6-hydroxypyrimidine,
2,4,6-triamino-5-nitrosopyrimidine,
triamino-6-phenylpteridine,
2,4,6-triaminopyrimidine,
2,4-bis(p-aminobenzyl)aniline,
α,α',α''-tris(4-aminophenyl)-1,3,5-triisopropyl benzene,
1,2,4,5-tetraaminobenzene,
3,3',4,4'-tetraaminobenzophenone,
3,3',4,4'-tetraaminodiphenyl,
3,3',4,4'-tetraaminodiphenyl ether,
2,4,5,6-tetraaminopyrimidine, and
2,2'-bis(aminobenzyl)-methylenedianiline.

6. The resin of claim 1, wherein the molar ratio of bis-imide to amine varies about 2:1 to about 10:1.

7. The resin of claim 1, wherein the N,N'-bis-imide is N,N'-4,4'-diphenylmethane-bismaleimide.

8. The resin of claim 1, wherein the polyamine is 2,4-bis(p-aminobenzyl)aniline.

9. The resin of claim 1, having a glass transition temperature above about 300° C.

10. The resin of claim 1, having a decomposition temperature above about 450° C.

11. A thermosetting cross-linked imide resin consisting of the polymeric reaction product formed from the non-catalytic reaction of N,N'-4,4'-diphenylmethane-bismaleimide with 2,4-bis(p-aminobenzyl)aniline wherein the molar ratio of bis-imide to amine varies from about 2:1 to about 10:1, and said resin has a decomposition temperature above about 450° C.

12. A non-catalytic process for preparing a thermosetting cross-linked imide resin consisting of:
(a) reacting a single aromatic polyamine selected from the group consisting of:

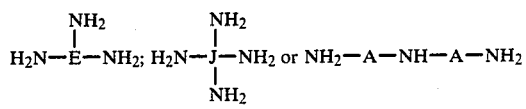

wherein E and J are aromatic trivalent and tetravalent groups, respectively, and A is a divalent group with at least one aryl moiety; with
(b) an aromatic N,N'-bisimide of an unsaturated dicarboxylic acid having the formula:

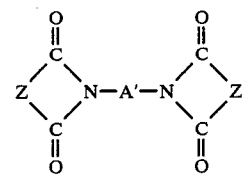

wherein Z is a divalent group containing a —C≡C— bond, A' is a divalent group with at least one aryl moiety, the molar ratios of (a):(b) vary from about 1:2 to about 1:10, and the reaction temperature varies from about 100° to 250° C. for a time sufficient to form a moldable and curable thermosetting prepolymerized imide resin.

13. The process of claim 12, wherein the reactants are heated in an organic solvent or diluent.

14. The process of claim 13, wherein the prepolymerized imide is heated to a temperature of about 100° C. to 350° C. to yield a substantially insoluble, infusible, cross-linked polymerized imide resin of high thermal stability.

15. The process of claim 13, wherein the heating between 100°–350° C. is carried out in the presence of a curing accelerating catalyst.

16. The process of claim 12, wherein the N,N'-bis-imide is selected from the group consisting of:
N,N'-metaphenylene-bismaleimide,
N,N'-paraphenylene-bismaleimide,
N,N'-4,4'-diphenylmethane-bismaleimide,
N,N'-4,4'-diphenylether-bismaleimide,
N,N'-4,4'-diphenylsulphone-bismaleimide,
N,N'-metaxylylene-bismaleimide,
N,N'-4,4'-diphenylcyclohexane-bismaleimide,
N,N'-4,4'-diphenylsulfide-bismaleimide,
N,N'-2,4-toluene-bismaleimide,
N,N'-2,6-toluene-bismaleimide,
N,N'-p-xylylene-bismaleimide,
N,N'-m-phenylene-bis-citraconimide,
N,N'-4,4'-diphenyl methane bis-citraconimide, and N,N'-4,4'-diphenyl methane bis-itaconimide, and the polyamine is a primary amine selected from the group consisting of:
1,2,4-benzenetriamine,
2,4,5-triamino-6-hydroxypyrimidine,
2,4,6-triamino-5-nitrosopyrimidine,
triamino-6-phenylpteridine,
2,4,6-triaminopyrimidine,
2,4-bis(p-aminobenzyl)aniline,
α,α',α''-tris(4-aminophenyl)-1,3,5-triisopropyl benzene,
1,2,4,5-tetraaminobenzene,
3,3',4,4'-tetraaminobenzophenone,
3,3',4,4'-tetraaminodiphenyl,
3,3',4,4'-tetraaminodiphenyl ether,
2,4,5,6-tetraaminopyrimidine, and
2,2'-bis(aminobenzyl)-methylenedianiline.

17. The process of claim 16, wherein the N,N'-bis-imide is N,N'-4,4'-diphenylmethane-bismaleimide.

18. The process of claim 16, wherein the polyamine is 2,4-bis(p-aminobenzyl)aniline.

19. A thermosetting crosslinked imide resin formed by the process of claim 12.

* * * * *

UNITED STATES PATENT AND TRADEMARK OFFICE
CERTIFICATE OF CORRECTION

PATENT NO. : 4,731,436

DATED : March 15, 1988

INVENTOR(S) : Chi-Fei Ling

It is certified that error appears in the above-identified patent and that said Letters Patent is hereby corrected as shown below:

In the structural formula of the N,N'-bis-imide on line 8 of the Abstract (both occurrences), and on line 9 of the Abstract, change "B" to --Z--.

At column 1, line 53, change "B" to --Z--.

Signed and Sealed this

Twenty-third Day of August, 1988

Attest:

DONALD J. QUIGG

Attesting Officer

Commissioner of Patents and Trademarks